United States Patent [19]
Kim

[11] Patent Number: 6,066,385
[45] Date of Patent: May 23, 2000

[54] LAMINATOR FILM

[75] Inventor: Yang-Pioung Kim, Seoul, Rep. of Korea

[73] Assignee: GMP Co., Ltd., Seoul, Rep. of Korea

[21] Appl. No.: 09/100,988

[22] Filed: Jun. 22, 1998

[30] Foreign Application Priority Data

May 21, 1998 [KR] Rep. of Korea ............... 98-18372

[51] Int. Cl.[7] .................................................. B32B 3/30
[52] U.S. Cl. ........................................ 428/167; 428/172
[58] Field of Search ................................ 428/167, 213, 428/172, 41.8, 42.1

[56] References Cited

U.S. PATENT DOCUMENTS 4,781,957  11/1988  Brown et al. ..................... 428/43
4,986,496  1/1991   Marentic et al. .................. 428/167
5,301,981  4/1994   Nesis ................................ 283/73

*Primary Examiner*—Donald Loney
*Attorney, Agent, or Firm*—Harrison & Egbert

[57] ABSTRACT

A laminator film having a plurality of continuous, fine grooves on its surface in the lengthwise direction of the film. When the laminator film and a target film to be laminated are passed between a pair of hot, engaged rollers, the air between the grooved surface and the target film can be guided out through the grooves while the grooves are flattened by the pressure and heat of the rollers. Thus, it is completely preventive of air accumulation by virtue of their continuous fine grooves, giving a great improvement in adhesiveness, surface smoothness and transparency to the resulting laminated product.

3 Claims, 2 Drawing Sheets

LAMINATOR FILM

BACKGROUND OF THE INVENTION

1. Field of the Invention

The present invention relates to a laminator film which is preventive of forming creases, air bubbles and air pockets upon lamination and, more particularly, to a laminator film which has a plurality of continuous, fine grooves close together to its contact surface, through which the air between the contact surface and a target film can be guided out when laminating the film on the target film.

2. Description of the Prior Art

For a lamination technique with which a thermoplastic film or coat is laminated on a target film, the adhesiveness between the film or coat and the target film is a very important factor. Prevention of air accumulation between the film or coat and the target film is also critical to the technique. In other words, a good laminated product cannot be expected without excellent adhesiveness and exclusion of air accumulation between a laminator film and a target film.

If air accumulates between a film or coat and a target film when laminating, creases, air bubbles or even air pockets occur in the resulting laminated products, making the products poor in appearance. Air bubbles, even if fine, deteriorate the transparency and vividness of high quality printed matters. Air pockets, which are distinct from air bubbles in size, make the film or coat come off the target film as well as move around from place to place, resulting in a great decrease in the adhesiveness between the film or coat and the target film.

Conventionally, in order to avoid the creases, air bubbles or air pockets resulting from air accumulation, a laminator film is laminated on a target film with the aid of a pair of engaged rollers. The two sheets enter the space between the rollers in such a way that the angle between the laminator film and the target film may be as large as possible.

Another means to prevent air accumulation is corona discharge. Laminator films are subjected to corona discharge to form protrusions on the laminating surface of the laminator film or fine holes which penetrate the films.

Formation of an embossed surface on a laminator film has been used to prevent the occurrence of the creases and air pockets upon its lamination. In one method, an embossed surface is made by passing a thermoplastic film overlaid by a woven cloth through an interspace between a pair of hot engaged rollers and by then removing the woven cloth.

However, the discontinuous fine holes or protrusions formed on the contact surface of a laminator film by corona discharge or embossing, respectively, cannot continuously guide the air out between the contact surface of the film and the target film, so that creases or air pockets cannot be efficiently prevented with these methods.

SUMMARY OF THE INVENTION

The intensive and thorough research on laminator film, repeated by the present inventors, resulted in the finding that, if a plurality of continuous fine grooves are formed close together on a contact surface of laminator film, the air between the contact surface and a lamination target film is guided out therethrough when laminating the laminator film on the target film by passing them between a pair of engaged rollers in such a way that the target film is overlaid on the contact surface of the laminator film, whereby creases, air bubbles or air pockets are not formed on the resulting laminated product.

Therefore, it is an object of the present invention to provide a laminator film with which a laminated product of superior adhesiveness, surface smoothness and transparency can be obtained.

In accordance with the present invention, the above object could be accomplished by a provision of a laminator film, on a contact surface of which a plurality of continuous, fine grooves are formed close together in the lengthwise direction of the film.

BRIEF DESCRIPTION OF THE DRAWINGS

The above and other objects and aspects of the invention will become apparent from the following description of embodiments with reference to the accompanying drawings in which.

DETAILED DESCRIPTION OF THE PREFERRED EMBODIMENTS

Figure 1:
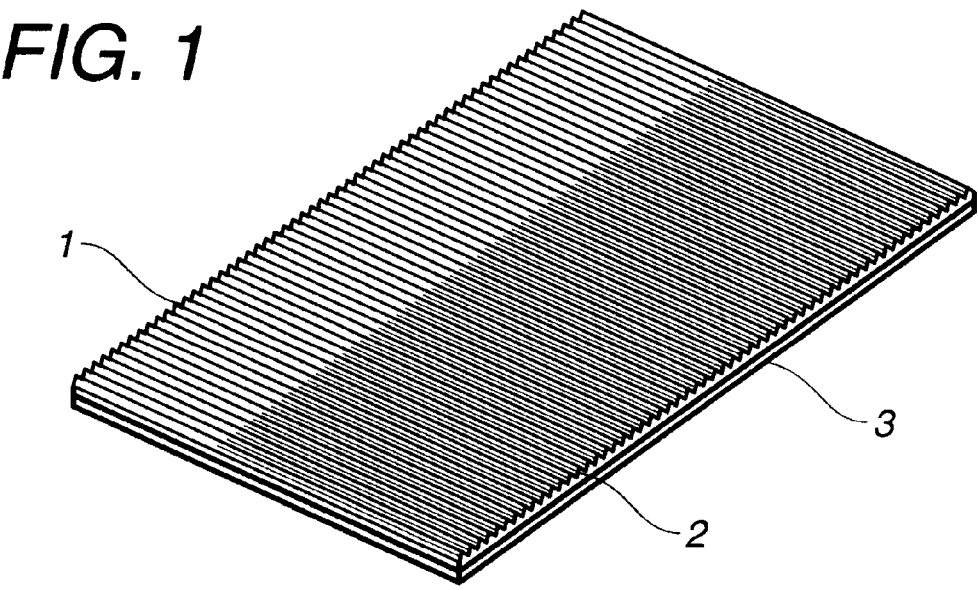
FIG. 1 is a schematic view showing a laminator film having a plurality of continuous, fine grooves of a triangular cross section which are formed close together on its contact surface, according to one embodiment of the present invention.

The application of the preferred embodiments of the present invention is best understood with reference to the accompanying drawings, wherein like reference numerals are used for like and corresponding parts, respectively.

Referring to FIG. 1, there is shown a laminator film structure according to an embodiment of the present invention. As shown in FIG. 1, the laminator film structure comprises a laminating film 2 one surface of which has a plurality of continuous, parallel grooves 1 of a triangular cross section which are formed adjacent to one another in the lengthwise direction of the film, with the other surface being supported on a backing film 3.

The laminating film 2 is a thermoplastic film with a relatively low melting point. Examples thereof include polyethylene films, polypropylene films, polyvinylchloride (PVC) films, ethylene-ethylacrylate copolymer (EEA) films, and ethylene-vinylacetate copolymer (EEA) films. As for the backing film, it is a thermoplastic film with a relatively high melting point, such as polyester film.

When the laminator film of the present invention, together with a target film on which to laminate, for example, a polyester film, is passed between a pair of hot rollers in such a way that the grooved surface of the laminator film 2 faces to the target film, the laminating film 2 is melted by the heat of the rollers while the backing film 3 is not, because of their difference in melting point. The grooves 1, on the laminating film 2, are respectively melted and flattened by the heat and pressure from the rollers. As a result, the laminator film is fused to and thus, laminated on the target film.

In addition, while the laminator film is laminated on the target film, the grooves on the laminating film serve as air outlets so as not to accumulate air in the resulting laminated film. That is, while the laminator film and the target film pass through the interface between the hot rollers, the air arrested between the films is ventilated along the grooves so that no creases, air bubbles or air pockets are formed in the resulting laminated films, thereby bringing a great improvement to adhesiveness, surface smoothness and film transparency.

The grooves on the thermoplastic film are of relatively low melting point range, in depth, from about 0.02 to 0.07 mm and preferably from about 0.03 to 0.05 mm. For example, if the grooves are too shallow, the air accumulation-preventive effect as described above cannot be expected. On the other hand, if the grooves are too deep, they may not be flattened by the pressure of the rollers, which deleteriously affects the resulting laminated products in surface smoothness.

Figure 2:
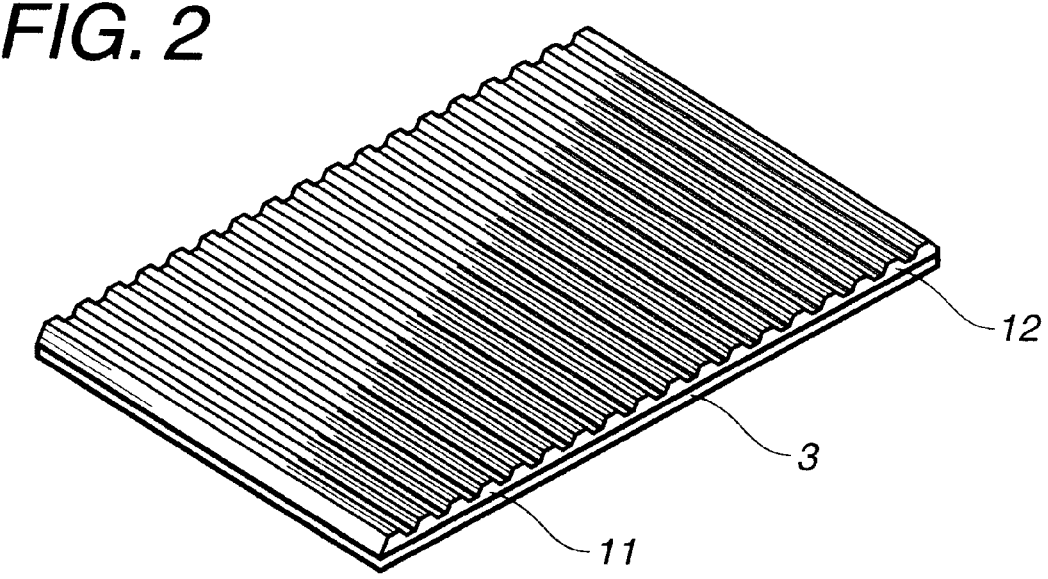
FIG. 2 is a schematic view showing a laminator film having a plurality of continuous, fine grooves of a trapezoidal cross section which are formed close together on its contact surface, according to another embodiment of the present invention.

Referring to FIG. 2, there is shown a laminator film structure according to another embodiment of the present invention. As shown in FIG. 2, the laminator film structure comprises a laminating film 12 one surface of which has a plurality of continuous, parallel grooves 11 of a trapezoidal cross section which are formed adjacent to one another in the lengthwise direction of the laminating film 12, with the other surface being supported on a backing film 13. This laminator film may be the same as that of FIG. 1 in all aspects including film kind and structure and groove depth, except for the cross sectional view of the laminating film 12.

Figure 3:
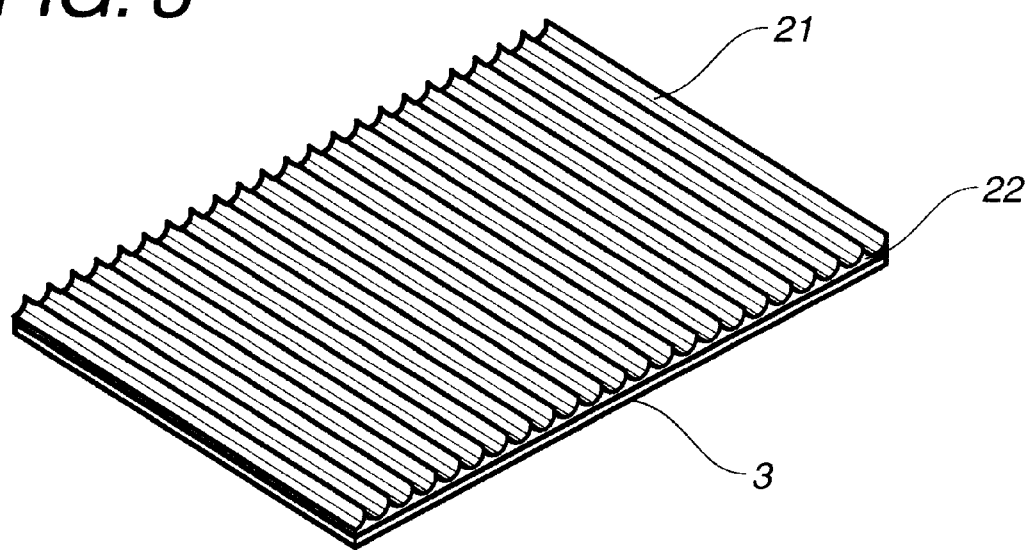
FIG. 3 is a schematic view showing a laminator film having a plurality of continuous, fine grooves of a semicircular cross section which are formed close together on its contact surface, according to a further embodiment of the present invention.

Referring to FIG. 3, there is shown a laminator film structure according to a further embodiment of the present invention. As shown in FIG. 3, the laminator film structure comprises a laminating film 22 one surface of which has a plurality of continuous, parallel grooves 21 of a semicircular cross section which are formed adjacent to one another in the lengthwise direction of the laminating film 22, with the other surface being supported on a backing film 23. This laminator film may be the same as that of FIG. 1 in all aspects including film kind and structure and groove depth, except for the cross sectional view of the laminating film 22.

Alternatively, a thermoplastic film of relatively low melting point, such as one selected from the group consisting of polyethylene film, polypropylene film, PVC film, EEA film and EVA film, itself may be used as a laminator film of the present invention if a plurality of parallel, continuous grooves with a cross section of triangle, trapezoid or semicircle design are formed adjacent to one another in the lengthwise direction of the film on its one surface.

In another aspect of the present invention, the backing film may be of great releasability, such as a release plastic film, a release overlay, or release paper. That is, after lamination, the laminating film alone is left on the target film because the backing film is released. In this case, the laminating film may be prepared by coating a relatively low melting point thermoplastic resin solution in an organic solvent on the released backing film and forming a plurality of parallel, continuous grooves of a triangular, trapezoidal or semicircular cross section on the exposed surface of the coating layer in the lengthwise direction of the film.

Concerning formation of the grooves, it may be accomplished by using a molding roller (embossing roller) on the surface of which projected patterns with a triangular, trapezoidal or semicircular cross section are formed in the rotating direction of the roller. That is, a thermoplastic film, of relatively low melting temperature alone or as supported on a backing film, is passed between the molding roller and a smooth surface roller in such a way that one surface of the thermoplastic film faces the molding roller optionally with one surface of the backing film facing the smooth surface roller, followed by cooling the thermoplastic film. Here, the molding roller and its engaged smooth roller must keep a temperature between the softening point and melting point of the thermoplastic film.

Figure 4:
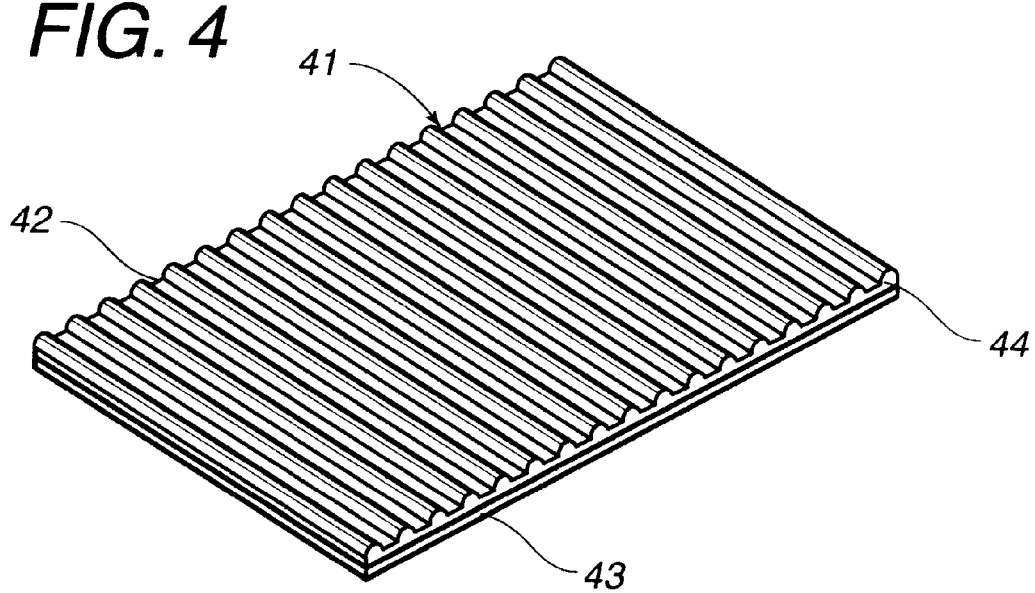
FIG. 4 is a schematic view showing a laminator film having a plurality of continuous, fine protrusions which are formed close together, according to still another embodiment of the present invention.

With reference to FIG. 4, there is shown a laminator film structure according to still another embodiment of the present invention. The laminator film structure comprises a heat-fusible film 44 to one surface of which a plurality of monofilaments 42 are partly fused in a regular narrow space pattern in the lengthwise direction of the film 44, with the other surface being backed by a base film 43. The monofilaments are made from a thermoplastic resin of low melting point. Therefore, when the laminator film of FIG. 4 is laminated on a target film by passing both of them between a pair of hot rollers, the monofilaments are melted to fuse to the target film with the spaces between the partly projected monofilaments serving as air outlets.

As described hereinbefore, the laminator film of the present invention has a plurality of continuous, fine grooves on its surface in the lengthwise direction of the film, so that, when the laminator film and a target film to be laminated are passed between a pair of hot, engaged rollers, the air between the grooved surface and the target film can be guided out through the grooves while the grooves are flattened by the pressure and heat of the rollers.

Therefore, unlike the conventional laminator films which are embossed with the aid of a woven cloth or have discontinuous fine holes as a result of corona discharge, the laminator films according to the present invention are completely preventive of air accumulation by virtue of their continuous fine grooves, giving a great improvement in adhesiveness, surface smoothness and transparency to the resulting laminated product.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

I claim:

1. A laminator film structure comprising:

a laminating film having a contact surface adapted to be secured onto a target film, said contact surface having a plurality of continuous grooves formed adjacent to each other in a lengthwise direction of said laminating film; and a backing film secured to a surface of said laminating film opposite said contact surface, said backing film selected from the group consisting of a thermoplastic film with a higher melting point than said laminating film, a release plastic film, a release overlay, and a release paper, said backing film adapted to be released from said laminating film when said contact surface is secured to the target film.

2. The laminator film structure of claim 1, said grooves having a depth ranging between 0.02 mm and 0.07 mm inclusive.

3. The laminator film structure of claim 1, said laminating film selected from the group consisting of polyethylene film, polypropylene film, polyvinylchloride film, ethylene-ethylacrylate copolymer film and ethylene-vinylacetate copolymer film.

* * * * *